United States Patent Office 3,499,056
Patented Mar. 3, 1970

3,499,056
PREPARATION OF POLYENES BY PYROLYSIS OF ADDUCT OVER MOLECULAR SIEVE
George M. Bailey, Findlay, Ohio, and Danford H. Olson, Edwardsville, Ill., assignors to Marathon Oil Company, Findlay, Ohio, a corporation of Ohio
No Drawing. Filed Aug. 27, 1968, Ser. No. 755,739
Int. Cl. C07c 1/30, 29/14, 29/22
U.S. Cl. 260—681                            11 Claims

ABSTRACT OF THE DISCLOSURE

The invention is a process for the production of polyenes by the pyrolysis of halo-substituted ethers wherein the pyrolysis is carried out in the vapor phase over a molecular sieve. The reaction products of the pyrolysis step are the desired polyene product, hydrogen halide and an alcohol.

Background of the invention

In application Ser. No. 458,432 to D. W. Hall et al., filed May 24, 1965, now U.S. Patent No. 3,360,583, a process is described for the preparation of polyene compounds including the step of pyrolyzing or splitting a haloether olefin adduct to form a polyene compound. Briefly, this method comprises reacting a hydrogen halide, an alcohol and an aldehyde to form a haloether. The haloether is then reacted with an olefinic compound to produce an adduct. This adduct is then subjected to pyrolysis to produce hydrogen halide, an alcohol and a polyene.

Copending application 755,712, filed on the same day as this application also relates to the general subject matter of this application.

Brief description of the invention

Briefly, the present invention contemplates carrying out the pyrolysis of the haloether-olefinic adduct in the vapor phase in the presence of a molecular seive. Applicants have found that conducting the pyrolysis step in this manner increases yields and enhances the recovery of the desired polyene product and the hydrogen halide and alcohol reactants which may then be recycled for use in forming the haloether.

Detailed description of the invention

Reference may be had to U.S. Patent 3,360,583 for details of the overall process for the preparation of polyenes.

The initial step in the process comprises, as a preferred method, reacting hydrogen halide, an alcohol and an aldehyde to form a haloether. The reaction conditions for this step are not overly critical. Generally, the reaction may be carried out at temperatures ranging from about $-20°$ C. to about $+35°$ C. Although not necessary, it is preferred to employ an excess of hydrogen chloride to insure complete reaction.

Other methods for producing the haloethers are known. See, for example, L. Summers, Chem. Rev., vol. 55, p. 301 (1955).

The resulting haloether is subsequently reacted with a reactive olefin to form an adduct. Generally, this reaction is carried out in the liquid phase. The reaction conditions are not overly critical, however, since the reaction proceeds generally well at $-30$ to $70°$ C., preferably, from about 5 to about $35°$ C. The gaseous olefin may be sparged through the liquid haloether. Suitable solvents are the choloralkanes, e.g., carbon tetrachloride and dichloroethane, and alkane ethers such a diethyl ether, etc.

The reaction between the haloether and olefin is carried out in the presence of a catalyst, preferably, a Friedel-Crafts catalyst. The most preferred Friedel-Crafts catalysts are the metallic halides, such as zinc chloride, titanium tetrachloride, aluminum chloride, zirconium tetrachloride, ferric chloride and mercuric chloride. It is to be understood, however, that other metal halides can be used and any Friedel-Crafts catalyst is suitable for this reaction.

For a more detailed description of the reaction to form the adduct, reference may be had to H. Gross, Angewandte Chemie, International English Ed., vol. 6, No. 4, p. 335, April 1967.

The haloether adduct is subsequently cleaved to form the desired conjugated polyene. As indicated above, the cleavage or pyrolysis step is carried out in the vapor phase in the presence of a molecular sieve.

Suitable crystalline zeolites (molecular sieve catalysts) are those whose structure and composition render them particularly impervious to aqueous hydrogen halide. Catalysts not possessing these characteristics, although capable of promoting polyene formation, are not economically practical. It has been found that the Y type catalysts are substantially better in this respect and are to be preferred over the X type catalysts. For a more detailed description of molecular sieve catalysts, see Oil and Gas Journal, May 17, 1965, pages 91–95.

Although not necessary, it is sometimes desirable to impregnate the catalyst with various promoters. Suitable promoters are $ZnCl_2$, $CuCl_2$, $LiCl_2$, $LiBr_2$, HCl, LiF and the like. Alternately, the catalysts may be diluted with inert packing, e.g. carborundum. The catalyst and packing may be positioned in a column and the reactants passed concurrently or counter-currently through the packed catalyst.

The vapor phase reaction may be carried out in any convenient manner. The haloether-olefin adduct may be mixed with a suitable amount (e.g. about 0.1–10 moles of diluent/mole of adduct) of an inert diluent, e.g., $N_2$, $H_2$, C, $-C_8$ alkanes, etc. and vaporized in a pre-heating zone and then the vapor may be passed over the catalyst to effect cleavage. Alternately, the feed materials may be vaporized in the pyrolysis zone itself. It will be understood by those skilled in the art that any method generally acceptable for vapor phase type reactions may be utilized to effect cleavage of the haloether-olefin adduct. It will also be understood by those skilled in the art that any suitable apparatus generally acceptable for vapor phase type operations may be employed.

The ratio of adduct feed material to catalysts is not overly critical. In units of weight hourly spaced velocity, operable values are from 0.1 to 100, preferably 0.5 to 5. It will be apparent to those skilled in the art that the space velocity to be employed will depend on the nature of the haloether-olefin adduct feed, catalyst, temperature, etc.

The pressures and temperatures employed during the pyrolysis step are not critical. Obviously, reaction conditions must be employed which will insure a vapor phase operation. The particular conditions employed in a specific case will depend on the feed material, space velocity, etc. Generally, pressures ranging from about 0.1 to about 10 atmosphers, preferably from about 0.5 to about 3.0 atmospheres may be employed. Generally, normal atmospheric pressure gives excellent results. The cleavage temperature employed obviously will depend on the above-noted variables. Generally, the process may be carried out from 75° C. to about 500° C., preferably, from about 150° C. to about 350° C. Employing the preferred catalysts noted above, the most satisfactory operating temperatures range from 200° C. to 350° C.

The polyene product, hydrogen halide and alcohol may be recovered by any suitable method. It will be appreciated by those skilled in the art that any recovery method suitable for recovering products from vapor phase type operations may be employed. Suitably, the product vapors may be processed in a water scrubber so that the hydrogen halide and alcohol are recovered from the scrub water. Non-volatile organic materials, such as excess haloether-olefin adduct feed may be condensed during the water-scrubbing operation and removed as a separate liquid phase and recycled. The volatile components, such as the desired polyene product and the small amounts of alkyl halides formed by the reaction of portions of the hydrogen halide and alcohol may either be condensed in the water scrubber or alternately, entrained in an inert gas such as nitrogen or steam, etc. and condensed in a subsequent receiver.

The cleavage step of the present invention is applicable for the pyrolysis of any haloether-olefin adduct to form the corresponding polyene, hydrogen halide and alcohol. Generally, any of the haloether-olefin adducts described in U.S. Patent 3,360,583 may be employed. Generally, any alpha-haloether may be employed for the adduction formation. The alpha-monohalo lower alkane ethers, either symmetrical or asymmetrical, are preferred. Preferably, these haloethers are substituted in the alpha position with chloro, bromo or iodo substituents and are either methyl, ethyl or propyl ethers. Suitable symmetrical alpha-haloethers includes bis(chloromethyl) ether, bis(alpha-bromomethyl) ether, bis(alpha-iodopropyl) ether, etc. Asymmetrical ethers include alpha, beta, dichloro-diethyl ether, dichloromethyl methyl ether, chloromethyldodecyl ether, chloromethyl p-chlorophenyl ether, alpha-bromo-ethyl ethyl ether, alpha-iodomethyl propyl ether, chloromethyl methyl ether, chloromethyl phenyl ether, etc. Cyclic ethers such as 2,5-dichlorotetrahydofuran, alpha-phenyl-alpha-chloromethyl pyrocatechol and 2,3-dichlorotetrahydropyran, etc. may also be employed. Also suitable as a reactant is mono-chloroethylene carbonate. Reference may be had to the above cited Gross article for other suitable ethers.

The olefins suitable for forming the adduct material are any of those described in U.S. Patent 3,360,583. Generally any reactive olefin not spatially or sterically hindered may be employed. It will also be understood that the term "olefin" includes not only unsaturated aliphatic hydrocarbons, but also, substituted unsaturated, aliphatic hydrocarbons, cyclo-aliphatic unsaturated hydrocarbons, etc. Suitable materials include the halogen-substituted olefins, preferably mono-halogen olefins wherein the halogen atom is contained on an olefinic carbon atom. Additionally, other halogen atoms may be substituted on other carbon atoms within the molecule. Aromatic hydrocarbon substituted olefins are also suitable as well as aliphatic-substituted olefins. Suitable olefins include allyl chloride; allyl bromide; 3-methyl-3-butenyl methyl ether; 2-fluoropropene; butadiene; isoprene; 2-chloro-propene; cyclohexene; styrene; p-chlorostyrene; ethylene; 2-butene; propylene; 3-methyl-2-butene; 1-pentene; 2-pentene; 2-methyl-2-butene; 1,3-pentadiene; 2,3-dimethyl-1, 3-butadiene; 2,3-dimethyl-2-butene; 1,3-cyclohexadiene; 2,4-hexadiene; 1-octene; cyclohexoethylene; allylbenzene; etc. Preferably, the olefins contain from 2 to 9 carbon atoms.

It will also be appreciated by those skilled in the art that vapor phase operations are subject to easier control and are more efficient than corresponding liquid phase operations.

The invention will be further illustrated by the following non-limiting examples:

EXAMPLE 1

This example describes the pyrolysis of 3-chloro-3-methyl butyl methyl ether (CMBME) to produce isoprene, methanol and hydrogen chloride according to the following reaction.

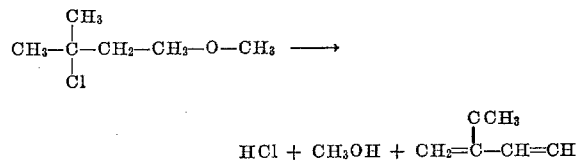

An apparatus for synthesizing chloromethyl methyl ether consisting of an upright tubular glass vessel 2" in diameter and 18" long, and a stirrer which extends to within ½" of the bottom of the vessel with a bottom outlet and a cooling jacket, is used. Near the top of the reactor is an outlet connected to a bubble-type, gas flow indicator device and a Dry Ice trap. An additional opening in the top of the vessel serves as an inlet for solid and liquid reagents. This inlet is sealed during runs.

The apparatus provides for thorough mixing of the reagents and separation of the aqueous and organic phases formed during the preparation of chloromethyl methyl ether. To this reactor is added paraformaldehyde (Matheson, minimum claimed $CH_2$, 95%; found by actual analysis, 96%; 55.9 g.; 2.14 moles), and methanol (Merck, reagent, 67.3 g.; 2.12 moles). The mixture is stirred vigorously and cooled to 10° C. while gaseous HCl is introduced. After about one hour, the gas flow device attached to the exit tube indicates that HCl absorption has ceased.

The mixture is the permitted to warm to room temperature, and stirring is discontinued to allow the two phases to separate. The lower aqueous phase, saturated with HCl and containing some methanol, formaldehyde and a very small amount of methylal, is drained into a tared flask containing a weighted amount of distilled water. The weight of this lower phase is 86.4 g.; it is found to contain 4.39 g. formaldehyde (this figure includes formaldehyde from all sources present in the solution such as, for example, methylal). The organic phase contains chloromethyl methyl ether (CME).

1.0 g. of zirconium tetrachloride catalyst is added to the CME phase and admixed with refinery butylene streams containing from about 5–25% isobutylene. This hydrocarbon feed is utilized in such an amount that the isobutylene therein is equal to or greater than (on a molar basis) the CME charged. The reaction is conducted at about 25° C. After a reaction period of sufficient duration to transform all of the CME present, the crude product is transferred from the reactor to a distillation tower where most of the excess hydrocarbon feed is flashed. The bottoms from the flash distillation is washed to remove catalyst.

The crude product thus obtained contains 0–15% residual $C_4$ hydrocarbons, 0–8% byproduct terbutylchloride, 0–3% unsaturated ether intermediates derived from the addition reaction product, 40–75% CMBME, 0–5% 3-chloro-2-methyl-butyl methyl ether, 0–1% 3-chloropentyl methyl ether, 0–3% of a mixture of di- and tri-isobutylene, and 0–20% of heavy byproducts, mainly composed of chlorinated ethers such as 1,5-dimethoxy-3-methyl-3-chloropentane. The crude product vapor enters a column packed with Linde SK 400 Y type molecular sieve catalyst and is passed through the catalyst at a space velocity of 1. The reaction temperature is maintained within the range of 275–300° C. at atmospheric pressure. The exit gas from the pyrolysis reaction contains the above-mentioned amounts of residual $C_4$ hydrocarbons enriched with isobutylene derived from the pyrolysis of t-butylchloride. In addition to the desired product, isoprene, the vapor contains HCl split from all of the above-mentioned chlorine containing compounds. The vapor also contains methanol split from all feed compounds possessing at least one methyoxy group.

Also present in the exit vapor are water (steam) and methyl chloride derived from the reaction between methanol and HCl in the pyrolysis reactor. Additional components in the effluent vapor are unsaturated ether intermediates derived from CMBME, 2-butene-CME adduct, 1-butene-CME adduct, and heavy chlorinated ether by-products. 2-vinyl-1-3-butadiene is present derived from 1,5-dimethoxy-3-methyl-3-chloropentane.

The crude product vapor is passed into a scrubbing tank containing water. Methanol, HCl and steam are absorbed into the water layer. A side stream is taken from the water layer and the alcohol and HCl components are recovered and recycled to the CME preparation step. Residual $C_4$ hydrocarbons and methyl chloride pass through the water scrubber and are separated in a fractionating column. The isobutylene-enriched hydrocarbons may be passed to the CME addition reactor.

The small amount of methyl chloride formed may be isolated and recycled where it is converted back to methanol and HCl for recycling to the CME preparation step, or it may be sold.

The other components from the pyrolysis reactor effluent condense in the water scrubber and form an organic phase. The liquid organic phase is continually withdrawn from the scrubber and fractionated to obtain polymerization grade isoprene and small amounts of 2-vinyl-1-3-butadiene. All of the remaining components are recycled and combined with the crude product from the adduct formation step prior to entry of that material into the preheater section for vaporization and passage through the pyrolysis step.

The following examples are illustrative of the advantageous results produced by the present invention. In each case, the process described is identical to that in Example 1 except where noted in Table I.

TABLE I.—ISOPRENE BY PYROLYSIS OF CMBME OVER MOLECULAR SIEVE CATALYSTS

| Example | Catalyst Type* | Space Velocity [2] | Temperature (° C) | Material Balance (percent) | Yield (mole percent) | | | | | Heavy oil yield (wt percent) |
|---|---|---|---|---|---|---|---|---|---|---|
| | | | | | Isoprene | Intermediate unsaturated ethers | Methanol | Methyl chloride | HCl | |
| 2 | SK-400 | 0.81 | 200 | 96.8 | 83.5 | [4] | 21.2 | 72.4 | [4] | 3.6 |
| 3 | SK-400 | 0.77 | 250 | 96.6 | 82.7 | <1.0 | 14.1 | 71.6 | 17.6 | 3.6 |
| 4 | SK-400 | 0.90 | 250 | 96.6 | 82.0 | [4] | 6.2 | 83.5 | [4] | 4.4 |
| 5 | SK-400 | 1.13 | 250 | 97.9 | 81.5 | [4] | 15.9 | 73.7 | [4] | 3.2 |
| 6 | SK-400 | 0.87 | 300 | 96.1 | 76.6 | 5.6 | 25.2 | 52.8 | 40.7 | 4.1 |
| 7 | SK-400 | 0.88 | 300 | 94.5 | 78.3 | [4] | 2.9 | 64.0 | [4] | 4.9 |
| 8 | AW-300 | 0.67 | 250 | 95.2 | 64.5 | Trace | 56.8 | 34.0 | 55.4 | 13.5 |
| 9 | AW-300 | 0.65 | 300 | 98.5 | 71.8 | Trace | 66.9 | 31.0 | 59.0 | 7.9 |
| 10 | AW-300 | 0.62 | 350 | 97.8 | 65.8 | Trace | 32.3 | 50.6 | 37.1 | 6.8 |

[1] All catalysts are "Y-type" manufactured by Linde Division of Union Carbide Corporation.
[2] Weight of CMBME feed per weight of Catalyst per hour.
[3] Freshly distilled CMBME was used in all examples. CMBME conversion is presumed near 100 percent; this was judged by spectral analyssi of the heavy oil.
[4] Not determined.

The process of the present invention is not intended to be limited by the foregoing examples, but rather only by the appended claims.

What is claimed is:

1. In a process for the preparation of polyolefinic compounds by the pyrolysis of an olefin-haloether adduct to form a polyolefinic compound, hydrogen halide and alcohol, the improvement comprising carrying out said pyrolysis in the vapor phase in the presence of a molecular sieve.

2. The process of claim 1 including the step of reacting a haloether and an olefinic compound to produce said adduct.

3. The process of claim 1 wherein the weight hourly space velocity of said olefin-haloether adduct is in the range of from about 0.1 to about 10.

4. The process of claim 1 wheren the raction pressure for the pyrolysis is in the range of from about 0.1 to about 10 atmospheres.

5. The process of claim 1 wherein the reaction temperature for pyrolysis is in the range of from about 75° to about 500° C.

6. The process of claim 2 wherein said haloether is a chloromethyl lower alkyl ether and said olefin is selected from the group consisting of hydrocarbon and halo-substituted olefins having from 2 to 9 carbon atoms.

7. The process of claim 6 wherein said haloether is chloromethyl methyl ether and said olefin is isobutylene and said polyolefinic compound is isoprene.

8. In a process for the preparation of polyolefinic compounds by forming a haloether, reacting said haloether with an olefinic compound to form a haloether adduct of said olefinic compound and splitting hydrogen halide and an alcohol from said adduct to form a polyolefinic compound, the improvement comprising carrying out said splitting step in the vapor phase in the presence of a molecular sieve catalyst.

9. The process of claim 8 wherein said haloether is formed by reacting hydrogen halide, an alcohol and an aldehyde.

10. The process of claim 9 including the steps of separating said hydrogen halide and said alcohol from said polyolefinic compound, reacting said hydrogenhalide and said alcohol with an additional amount of aldehyde to form at least a portion of said haloether starting material.

11. The process of claim 10 wherein said hydrogen halide is hydrogen chloride, said alcohol is methanol, said aldehyde is formaldehyde, said haloether is chloromethyl methyl ether, said olefin is isobutylene and said polyolefinic compound is isoprene.

References Cited

UNITED STATES PATENTS 3,360,583   12/1967   Hall et al. _____ 260—681

DELBERT E. GANTZ, Primary Examiner

G. E. SCHMITKONS, Assistant Examiner

PO-1050
(5/69)

UNITED STATES PATENT OFFICE
CERTIFICATE OF CORRECTION

Patent No. 3,499,056      Dated Mar. 3, 1970

Inventor(s) G. M. Bailey and D. H. Olson

It is certified that error appears in the above-identified patent and that said Letters Patent are hereby corrected as shown below:

Col. 2, line 66, "atmosphers" should read --atmospheres--

Col. 3, line 37, "bromomethyl" should read --bromoethyl--

Col. 3, line 43, "hydofuran" should read --hydrofuran--

Col. 4, line 10, ". . . C-CH=CH" should read -- . . . C-CH=CH$_2$--

Col. 4, line 34, "is the permitted" should read --is then permitted--

Col. 4, line 64, "1,5-dimethoxy-3-" should read 1,5-dimethyoxy-3--

Col. 5, line 9, "1,5-dimethoxy-3" should read 1,5-dimethyoxy-3--

Example 5: "81.5" should read --85.1--

Example 9: "98.5" should read --98.3--

Claim 4, line 1: "the raction pressure" should read --the reaction pressure

Claim 10, line 3: "hydrogenhalide" should read --hydrogen halide--

SIGNED AND
SEALED
AUG 11 1970

(SEAL)
Attest:

Edward M. Fletcher, Jr.
Attesting Officer

WILLIAM E. SCHUYLER, JR.
Commissioner of Patents